April 14, 1970 F. G. ADAM 3,506,892

JUNCTION TRANSISTOR

Filed April 2, 1968 3 Sheets-Sheet 1

INVENTOR

FRITZ G. ADAM

BY Philip M. Bolton

ATTORNEY

INVENTOR
FRITZ G. ADAM

BY Philip M. Bolton

ATTORNEY

April 14, 1970 F. G. ADAM 3,506,892

JUNCTION TRANSISTOR

Filed April 2, 1968 3 Sheets-Sheet 3

INVENTOR

FRITZ G. ADAM

BY Philip M. Bolton

ATTORNEY

United States Patent Office 3,506,892
Patented Apr. 14, 1970

3,506,892
JUNCTION TRANSISTOR

Fritz Gunter Adam, Freiburg, Germany, assignor to International Standard Electric Corporation, New York, N.Y., a corporation of Delaware Filed Apr. 2, 1968, Ser. No. 718,057
Claims priority, application Germany, Apr. 4, 1967, D 52,697
Int. Cl. H01l 11/00, 5/00
U.S. Cl. 317—235 6 Claims

ABSTRACT OF THE DISCLOSURE

An NPIN transistor having an intrinsic layer which is thicker at the rim portion than it is below the emitter region. Voltage breakdown is determined by the thickness and resistivity of the intrinsic region. The thickness and specific resistance of the intrinsic region is such that with zero external biasing voltage, the space charge depletion layer of the collector base junction fills the entire intrinsic region and penetrates into a portion of the adjacent low resistivity zone of the same conductivity type.

BACKGROUND OF THE INVENTION

The present invention relates to NPIN or PNIP junction transistors comprising a high-resistivity intrinsic semiconductor layer between the collector region and the base region. The high-resistivity I-semiconductor layer may either be weakly n- or p-conductive. The present invention relates to the problem of improving the high breakdown voltage characteristic of an NPIN junction transistor while still retaining a low saturation voltage for the device. These two requirements are contradictory since by increasing the thickness of the high-resistivity semiconductor layer, the breakdown voltage increases while at the same time the saturation voltage increases, due to an increase in collector lead resistance.

In the case of the well-known epitaxial planar transistor, having a low saturation voltage is not a serious problem since a major portion of the collector region consists of a very low-resistivity semiconductor material which results in a low collector lead resistance. A further reduction of the collector lead resistance in the conventional type of epitaxial planar transistor is achieved in accordance with known techniques by etching a recess into the low-resistivity portion of the collector region wherein an ohmic contact electrode is attached. Moreover, it is also known to use the same procedure for NPIN- or PNIP-junction transistors.

SUMMARY OF THE INVENTION

It is an object of the present invention to optimumly dimension a high-resistivity semiconductor layer between the collector region and the base region of a junction transistor to obtain a high breakdown voltage and a small saturation voltage.

According to the broadest aspects of this invention the specific resistance and the thickness of the high-resistivity semiconductor layer between the collector and base region of a junction transistor is so dimensioned that a zero external voltage the space charge zone of the collector-base junction fills out the entire thickness of the high-resistivity semiconductor layer and penetrates somewhat into the neighbouring low-resistivity region of the same conductivity type.

At zero external voltage the collector space charge region should project to such an extent into the neighboring low-resistivity, i.e. highly doped region, that a large proportion of this highly doped region contributes toward the charge moment $$W_n \int_o WQ(W)dW$$

and, consequently, to the built-in so-called "diffusion voltage," as will be explained hereinafter with reference to FIG. 1. The higher the resistivity and the thinner the I-region is made, then the steeper the relative doping gradient $$\frac{1}{L_a}=\frac{1}{N}\frac{dN}{dX}$$

is chosen on both sides of this region, and thus the deeper space charge region will penerate into the neighbouring region.

DETAILED DESCRIPTION

Disregarding disturbing surface effects in a junction transistor according to the invention, the breakdown voltage $V_{CBO}$ is solely determined by the thickness $W_L$ of the high-resistivity I-region. If $W_L$ has been selected to obtain the desired breakdown voltage, the saturation voltage of the transistor may still be influenced by varying the specific resistance $\rho_c$ in the I-zone and the relative doping gradient $1/L_a$ at the margin of the I-region. As the values of $\rho_c$ and of $1/L_a$ increase, the saturation voltage $$V_{CE\ sat}=V_{B'E}(I_E)-V_{B'C'}(I_{C'}I_B)+I_CR_{CC'}$$

diminishes at a certain collector current $I_C$. On one hand the forward voltage $V_{B'C'}$ at the collector junction increases and, on the other hand the collector-series resistance $R_{CC'}$ decreases.

A good saturation behavior and a breakdown voltage of more than 250 volts will be obtained, for example, with the following values:

$W_L=20\mu$
$\rho_c=6000$ ohm/cm. N-conductivity
$L_a=0.1\mu$

Figure 1:
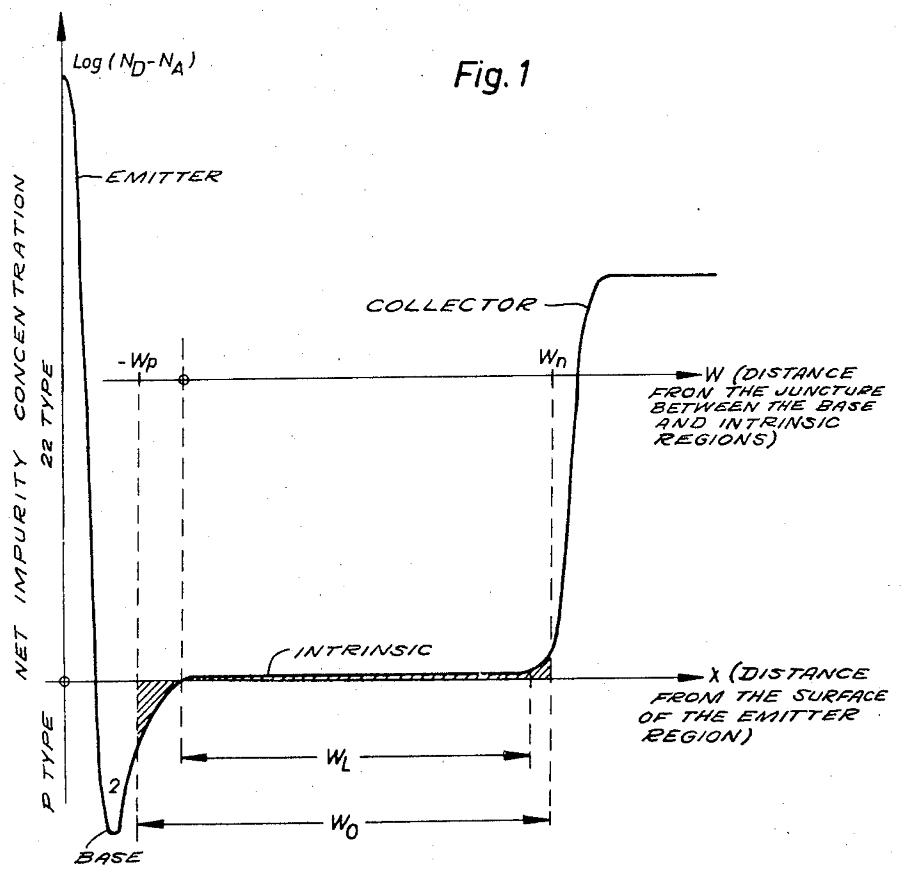
FIG. 1 shows a doping profile of a junction transistor according to the invention.

Such a dimensioning of an NPIN-junction transistor is shown in FIG. 1. On the left hand side of the drawing there is shown the high-doped N-conducting emitter region which is followed by the p-conducting base region. This base region is followed by the high-resistivity intrinsic N-conducting semiconducting layer with the thickness $W_L$ which is to be considered as belonging to the collector region whose main portion is of the high-doped N-conductivity type. The hatched area with the extension $W_0$ shows the space charge zone between the base and the collector region at zero voltage.

A specific embodiment of the junction transistor according to the present invention shows a high-resistivity semiconductor layer adjacent the area below the emitter region, and wherein the equipotential planes of the electrical field join the surface of the semiconductor body. According to the embodiment shown in FIG. 2 the field intensity at the surface of the semiconductor body is reduced by a factor ½ to ⅓ with respect to the inside which prevents premature voltage breakdowns at the surface, by assuring that voltage breakdown occurs on the inside of the device.

In the case of PIN rectifiers this aim is accomplished by suitably bevelling the sideway surfaces. This measure, however, only has the desired effect when the space charge zone at the voltage breakdown still terminates within the high-resistivity zone. Since the space charge zone, in the case of the junction transistor according to the present invention, already penetrates into the low-resistant area at zero voltage, any bevelling of the boundary areas of the high-resistivity semiconductor layer as pushed through at the sides of the field lines would cause an increase of the field intensity on the side surface. Therefore, the most favourable cutting angle is the right angle.

Figure 2:
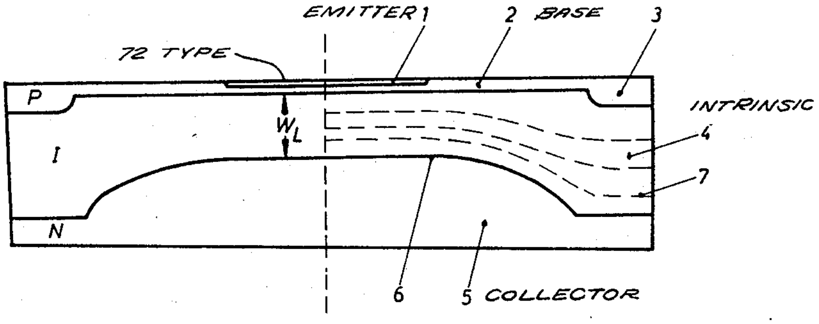
FIG. 2 shows a special type of embodiment of a junction transistor according to the invention.

A reduction of the field intensity $$E \approx V_{B'B'}/W$$

is actually achieved in this type of junction transistor by enlarging the thickness $W_L$ of the high-resistivity zone 4 near the surface at the margin of the semiconductor body, as shown in FIG. 2.

Figure 3A:
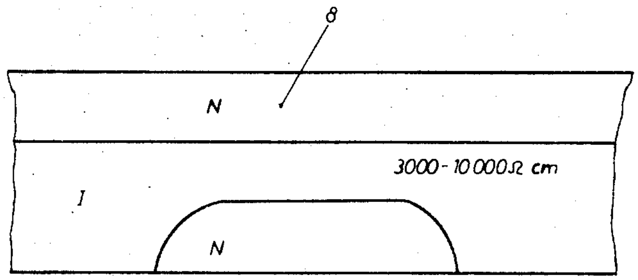
FIG. 3 shows the steps of operation necessary in the course of manufacturing one type of embodiment of a junction transistor according to the invention.
Figure 3B:

In the course of dividing the semiconductor wafer into single transistors by scratching and breaking in order to prevent obtaining a marginal area which is not vertical in relation to the potential planes, the base zone 2 is reinforced or thickened at the margin 3 to at least 10μ. The high-resistivity I-zone may either be a material of N- or P-conductivity, irrespectively of whether the transistor is an NPIN- or PNIP. In FIGS. 3 and 4 two different methods of manufacturing a junction transistor are illustrated according to the present invention employing an n-conducting high-resistivity intrinsic semiconductor layer. The finished transistor according to FIG. 3G, which corresponds to FIG. 2, comprises a collector region 5 with a salient 6 which, according to FIG. 3A, is diffused into a plate-shaped n-conducting silicon body of 3000 to 10,000Ω/cm., and a thickness of 210 to 300μ to a depth of about 80μ by employing the well-known masking method. In the course of this, on the non-masked surface side, there will result an n-conducting surface layer 8 of equal thickness which, according to FIG. 3B is removed by way of lapping and then polishing, so that the finished semiconductor body will almost have a thickness of 110μ.

Figure 3C:
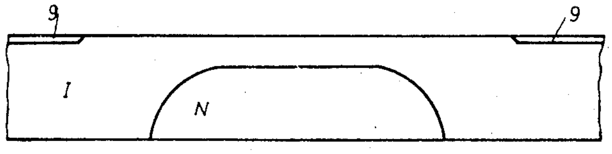
Figure 3D:
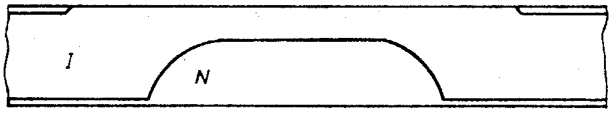
Figure 3E:
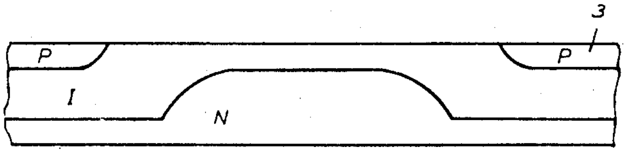
Figure 3F:
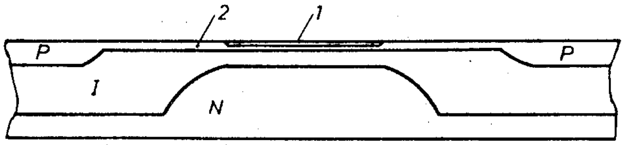
Figure 3G:
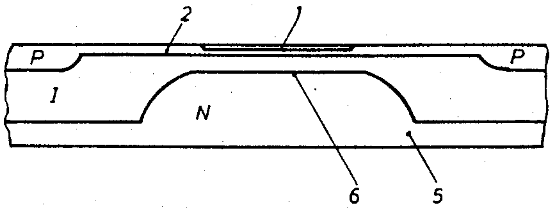
Figure 4A:
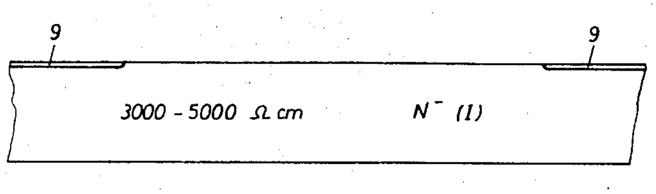
FIG. 4 shows the steps of operation necessary in manufacturing another embodiment of a junction transistor according to the invention.
Figure 4B:
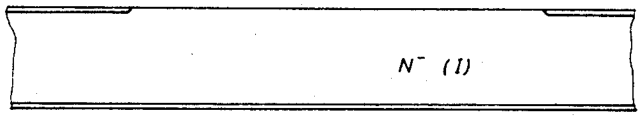
Figure 4C:
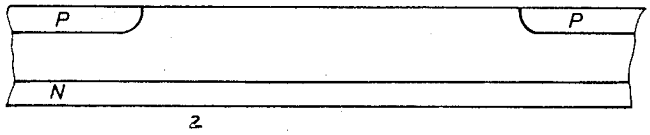
Figure 4D:
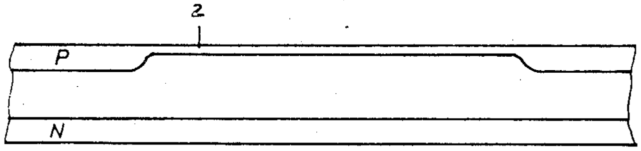
Figures 4E, 4F:
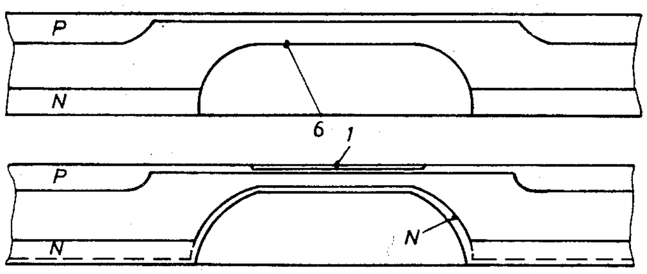
Figure 4G:
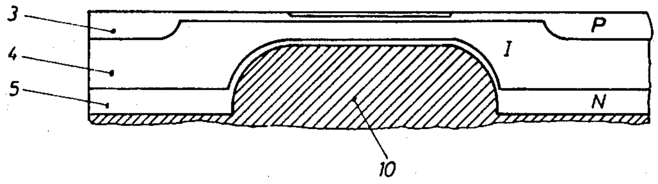

Subsequently thereto and in accordance with the showing of FIG. 3C at the points 9 and, in accordance with the showing of FIG. 3D, on the opposite side, phosphorus is appplied and pre-diffused. Thereupon, and in accordance with the showing of FIG. 3E, boron and phosphorus are diffused to a depth of 20μ, from which there will result the thickening 3 of the base zone. Thereupon there is effected the diffusion of the base zone 2 and of the emitter zone 1 in accordance with the showing of FIG. 3F by employing the generally known planar technique. Finally, and in accordance with the showing of FIG. 3G, the semiconductor plate is divided into a plurality of transistors all diffused in the same way. The thickened marginal area of the base zone safeguards that the equipotential areas will meet evenly and vertically upon the sideway surface edge of the semiconductor wafer when the surface edges of the semiconductor wafer are damaged, as is denoted in FIG. 3G by the breaking or bevelling of the edges.

FIG. 4 now to be described is a method which is preferred to the one with reference to FIG. 3. In this case the salient 6 of the low-resistivity collector zone portion is produced by etching a cavity which is filled with a solder. According to FIG. 4A we start with an n-conducting silicon wafer of 3000 to 10,000Ω/cm., and having a thickness of about 110μ, the same as the embodiment of FIG. 3. Boron is then applied to the points 9 and, thereupon, on the opposite side in accordance with FIG. 4B, phosphorus is applied. After the diffusion there will result a structure according to FIG. 4C comprising the boron diffused P region and the phosphorus diffused N region. Thereupon, and in accordance with FIG. 4D, the base zone 2 is formed in the well-known manner by the diffusion of a p-conducting material into the semiconductor body. The marginal portion 3 of the base zone and the surface layer 5 have a thickness of about 20μ or more. FIG. 4E illustrates the step of operation required for manufacturing the salient of the collector zone, in the course of which there is etched a cavity 6 of about 75μ. Thereupon FIG. 4F, and together with the diffusion of the n-conducting emitter 1, and $N^+$-conducting surface layer is diffused on the opposite side into the cavity 6 and the cavity is preferably filled with a solder 10. The semiconductor plate or wafer is divided into single elements according to FIG. 4G. The thickened or reinforced marginal zone areas 3 and 5 again provide that the lines of force within the high-resistant semiconductor layer 4 proceed evenly and vertically in relation to the marginal area of the semiconductor wafer when, in the course of the division or separation of the wafer into separate devices, the edges are bevelled owing to smaller portions broken away.

The doping gradient at the salient 6 between the high-resistant semiconductor layer 4 and the low-resistant collector zone portion has the advantage of being substantially steeper for the method described in FIG. 4 than the method described in FIG. 3. Accordingly, the device described in FIG. 4 provides for a junction transistor having improved saturation voltage characteristics over the device described in FIG. 3.

While I have described the above principles of my invention in connection with specific embodiments, it is to be clearly understood that this description is made by way of example only and not as a limitation to the scope of my invention as set forth in the accompanying claims.

What is claimed is:

1. A junction transistor including a semiconductor layer having a selected one of a first and second conductivity type and a high specific resistivity, a collector region contiguous with one surface of said semiconductor layer, said collector region being of said first conductivity type and having a low specific resistivity with respect to said semiconductor layer, a base region contiguous with the opposite surface of said semiconductor layer, said base region being of said second conductivity type and having a low specific resistivity with respect to said semiconductor layer, an emitter region formed within a planar surface of said base region, said emitter region being of said first conductivity type, a space charge depletion layer associated with a collector base junction filling out the entire thickness of said semiconductor layer in the absence of an external voltage being applied between said collector and base regions, the thickness and resistivity of said semiconductor layer being selected to establish said depletion layer, and said semiconductor layer being thicker at an outer portion of said transistor than at an inner portion below said emitter region so that said inner portion controls the voltage breakdown of the device, wherein the improvement comprises:

the reverse value of a relative doping gradient being less than 1μ at a juncture between said semiconductor layer and the adjacent region of the same conductivity type as said selected conductivity type, said relative doping gradient being defined by the expression $$\frac{1}{N}\frac{dN}{dX}$$

N representing a net impurity concentration at said juncture, and $dN/dX$ representing the differential change in said net impurity concentration for a corresponding differential change in distance from said juncture toward said adjacent region, said depletion layer penetrating into said adjacent region, the depth of the penetration being greater as said reverse value decreases, thereby reducing the forward saturation voltage drop for said transistor.

2. A junction transistor according to claim 1, wherein said specific resistance of said high-resistivity semiconductor layer is greater than 1000Ω/cm.

3. A junction transistor according to claim 1 wherein the junctions between said high-resistivity semiconductor layer and the adjacent regions are standing vertically on the marginal areas of a plate-shaped semiconductor body.

4. A junction transistor according to claim 1 wherein said base region at said outer portion of said semiconductor body is thicker than 10$\mu$.

5. A junction transistor according to claim 1 wherein said collector region below said emitter region has a salient which extends into said high-resistivity layer.

6. A junction transistor according to claim 5 wherein said salient is filled with a solder.

References Cited

UNITED STATES PATENTS

| | | | |
|---|---|---|---|
| 2,843,516 | 7/1958 | Herlet | 148—33 |
| 2,869,084 | 1/1959 | Shockley | 333—80 |
| 2,895,109 | 7/1959 | Weinreich | 332—52 |
| 3,056,888 | 10/1962 | Atalla | 307—88.5 |
| 3,242,061 | 3/1966 | Armstrong | 204—143 |
| 3,245,846 | 4/1966 | Dohmelt et al. | 148—33.5 |
| 3,370,209 | 2/1968 | Davis et al. | 317—235 |

JOHN W. HUCKERT, Primary Examiner

S. BRODER, Assistant Examiner